US012599521B2

(12) United States Patent
Hawkins et al.

(10) Patent No.: US 12,599,521 B2
(45) Date of Patent: Apr. 14, 2026

(54) ADJUSTMENT DEVICE FOR REMOVABLY COUPLING A SEATBACK TO A SEAT

(71) Applicant: Blake Medical Group Inc., Hamilton (CA)

(72) Inventors: Chris Hawkins, London (CA); Stephen Orzel, Hamilton (CA); Graham Hills, Hamilton (CA); Kirk Mosna, Oakville (CA)

(73) Assignee: BLAKE MEDICAL GROUP INC., Hamilton (CA)

( * ) Notice: Subject to any disclaimer, the term of this patent is extended or adjusted under 35 U.S.C. 154(b) by 310 days.

(21) Appl. No.: 18/367,035

(22) Filed: Sep. 12, 2023

(65) Prior Publication Data

US 2024/0082083 A1 Mar. 14, 2024

Related U.S. Application Data

(60) Provisional application No. 63/405,598, filed on Sep. 12, 2022.

(51) Int. Cl.
*A61G 5/10* (2006.01)

(52) U.S. Cl.
CPC .................................. *A61G 5/1067* (2013.01)

(58) Field of Classification Search
CPC ........ A61G 5/1067; A47C 7/402; A47C 7/42; F16B 2/065
See application file for complete search history.

(56) References Cited

U.S. PATENT DOCUMENTS

| | | | | |
|---|---|---|---|---|
| 4,790,716 A | 12/1988 | McConnell | | |
| 5,197,780 A | 3/1993 | Coughlin | | |
| 5,624,009 A | 4/1997 | Benjamin et al. | | |
| 6,659,563 B2 * | 12/2003 | Float | .................... | A61G 5/0875 297/354.1 |
| 6,938,955 B2 | 9/2005 | VanSickle | | |
| 7,338,124 B2 | 3/2008 | McMillen | | |
| 7,918,506 B2 | 4/2011 | Hsiao | | |

(Continued)

FOREIGN PATENT DOCUMENTS

| | | |
|---|---|---|
| CN | 201888889 U | 7/2011 |
| DE | 19728413 A1 | 1/1999 |

(Continued)

OTHER PUBLICATIONS

European Search Report dated Jan. 23, 2024 in respect of Application No. 23196765.4.

(Continued)

*Primary Examiner* — Theodore V Adamos
(74) *Attorney, Agent, or Firm* — Smart & Biggar LP

(57) ABSTRACT

An adjustment device for removably coupling a seatback to a seat. The adjustment device can include a first adjuster and/or a second adjuster for adjusting respective linear and angular positions of the seatback relative to the seat. The first adjuster can include a first linear actuator, a main body and a sliding bed. The second adjuster can include a second linear actuator, a sliding bed and an angle plate pivotably coupled to the sliding bed. The first and second linear actuators can each include a cylindrical worm. The first adjuster and the second adjuster can be independently actuatable to change the position of the seatback relative to the seat.

14 Claims, 8 Drawing Sheets

(56) References Cited

U.S. PATENT DOCUMENTS

| | | | | |
|---|---|---|---|---|
| 8,360,523 | B2 | 1/2013 | Maierhofer et al. | |
| 8,567,863 | B2 * | 10/2013 | Hetzel | A61G 5/1067 297/354.11 |
| 9,010,864 | B2 * | 4/2015 | Goeckel | A61G 5/12 403/49 |
| 9,943,456 | B2 | 4/2018 | Goeckel | |
| 10,194,745 | B2 | 2/2019 | DuFresne | |
| 10,285,883 | B2 | 5/2019 | Miller | |
| 11,020,297 | B2 | 6/2021 | Tessmer et al. | |
| 2006/0076814 | A1 * | 4/2006 | Samila | A61G 5/12 297/354.12 |
| 2007/0085300 | A1 | 4/2007 | Loewenthal et al. | |
| 2008/0157581 | A1 * | 7/2008 | Whelan | A61G 5/1067 297/440.2 |
| 2008/0217880 | A1 * | 9/2008 | Whelan | A61G 5/122 280/250.1 |
| 2010/0276975 | A1 * | 11/2010 | Cooper | A61G 5/122 297/354.1 |
| 2012/0091300 | A1 * | 4/2012 | Bee | A61G 5/1067 248/219.4 |
| 2014/0246892 | A1 | 9/2014 | Samain et al. | |
| 2017/0135484 | A1 * | 5/2017 | DuFresne | A47C 1/027 |
| 2020/0383484 | A1 * | 12/2020 | Chernin | F16B 2/065 |
| 2022/0111770 | A1 | 4/2022 | Lee et al. | |

FOREIGN PATENT DOCUMENTS

| | | | |
|---|---|---|---|
| DE | 102020114594 | A1 | 12/2021 |
| EP | 0820749 | A1 | 1/1998 |

OTHER PUBLICATIONS

1 European Examination Report dated Oct. 24, 2024 in respect of Application No. 23196765.4.

* cited by examiner

ADJUSTMENT DEVICE FOR REMOVABLY COUPLING A SEATBACK TO A SEAT

CROSS-REFERENCE TO RELATED APPLICATION

This application claims priority to U.S. Provisional Application No. 63/405,598 filed Sep. 12, 2022, the entire contents of which are hereby incorporated herein by reference.

FIELD

The present disclosure is directed to a device for adjusting the position of a seatback relative to a seat.

BACKGROUND

The following paragraphs are not an admission that anything discussed in them is prior art or part of the knowledge of persons skilled in the art.

U.S. Pat. No. 6,938,955 discloses a powered lumbar support mechanism including a lumbar plate having a power mechanism having connecting links connected to opposite ends of the plate. One of the connecting links is longitudinally movable to change the convexity of the outer surface of the plate to adjust the lumbar support. The power mechanism includes a housing which retains a threaded rod threaded into a worm gear mechanism held within the housing. The housing also retains a motor having a worm which drives the threaded worm gear. The housing can also incorporate a second threaded rod, threaded to a second threaded worm gear also fixed within the housing such that the end of the second threaded rod is connected to a seat support so as to allow for the adjustability of the vertical position of the lumbar mechanism.

U.S. Pat. No. 7,918,506 discloses a padding structure for a chair including a back support, a seat plate, a foam disposed on the back support, two guiding lines mounted on the back support, and two guiding lines mounted on the seat plate. Each guiding line of the back support and the seat plate is connected with a resilient member to control flexibility of the resilient member. An adjustable member is used to control the expansion and retraction of the guiding lines to drive the resilient members to change their radii of curvature, correcting the user's improper posture.

U.S. Pat. No. 8,360,523 discloses an adjusting device for a lumbar support having a pair of spaced guide members, an adjusting member coupled to the pair of guide members, and a drive mechanism for effecting an adjustment of the lumbar support. The adjusting member is displaceable along the pair of guide members and configured such that the lumbar support is adjusted when the adjusting member is displaced. The drive mechanism comprises a motor, which is provided on the adjusting member so as to be displaceable along the guide members jointly with the adjusting member. The motor may be coupled to a shaft having a structured exterior surface, the drive mechanism being configured to effect a relative displacement between the adjusting member and the shaft.

INTRODUCTION

The following is intended to introduce the reader to the detailed description that follows and not to define or limit the claimed subject matter.

In an aspect, the present disclosure relates to an adjustment device for removably coupling a seatback to a seat. The adjustment device can include: a first adjuster for adjusting a linear position of the seatback relative to the seat; and a second adjuster for adjusting an angular position of the seatback relative to the seat.

The first adjuster can include a first linear actuator. The adjustment device can include a main body and a sliding bed, and the first linear actuator can link the main body and the sliding bed such that actuating the first linear actuator can cause linear displacement of the sliding bed relative to the main body. The first linear actuator can include a first cylindrical worm, and threads of the first linear actuator can mesh with a threaded recess of the sliding bed. The first linear actuator can be actuated about a first axis, and the sliding bed can translate between first and second linear positions in a direction that is parallel to the first axis.

The second adjuster can include a second linear actuator. The adjustment device can include a sliding bed and an angle plate pivotably coupled to the sliding bed, and the second linear actuator can link the sliding bed and the angle plate such that actuating the second linear actuator can cause angular displacement of the angle plate relative to the sliding bed. The second linear actuator can comprise a second cylindrical worm, and worm threads of the second linear actuator can mesh with teeth of the angle plate. The second linear actuator can be actuated about a second axis, and the angle plate can rotate between first and second angular positions about an axis that is perpendicular to the second axis.

The first adjuster and the second adjuster can be independently actuatable to change the position of the seatback relative to the seat. Each of the first linear actuator and the second linear actuator can be manually actuatable. The first linear actuator and the second linear actuator can be each actuatable from a rear side of the adjustment device.

The adjustment device can include a seatback coupling mechanism for removably securing the adjustment device to the seatback. The seatback coupling mechanism can include: a bracket including a first portion for coupling to the seatback, and a second portion including upper and lower pins; and a latching plate including a notch and a hook for receiving the upper and lower pins, respectively, to connect the adjustment device and the seatback. The seatback coupling mechanism can include a latch moveable between an unlocked position in which the latch is clear of the notch, and a locked position in which the latch restricts the upper pin within the notch.

The adjustment device can include a seat coupling mechanism for removably securing the adjustment device to a frame of the seat. The seat coupling mechanism can include a clamp that is configured to be secured to a frame of the seat. The seat coupling mechanism can be adjustable to raise and lower the seatback relative to the seat.

In an aspect, the present disclosure relates to an adjustment device for coupling a seatback to a seat. The adjustment device can include: a first worm gear; and a second worm gear. The first and second worm gears are each independently and manually actuatable to change a position of the seatback relative to the seat.

In an aspect, the present disclosure relates to an apparatus for adjusting a position of a first seat component relative to a second seat component. The apparatus can include a linear actuator, a main body and a sliding bed. The linear actuator can link the main body and the sliding bed such that actuating the linear actuator causes linear displacement of the sliding bed relative to the main body. The linear actuator can include a cylindrical worm, and threads of the linear actuator can mesh with a threaded recess of the sliding bed.

The linear actuator can be manually actuated about an axis, and the sliding bed can translate between first and second linear positions in a direction that is parallel to the axis.

In an aspect, the present disclosure relates to an apparatus for adjusting a position of a first seat component relative to a second seat component. The apparatus can include a linear actuator, a bed and an angle plate pivotably coupled to the bed. The linear actuator can link the bed and the angle plate such that actuating the linear actuator causes angular displacement of the angle plate relative to the bed. The linear actuator can include a cylindrical worm, and worm threads of the linear actuator mesh with teeth of the angle plate. The linear actuator can be manually actuated about a first axis, and the angle plate can rotate between first and second angular positions about a second axis that is perpendicular to the first axis.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
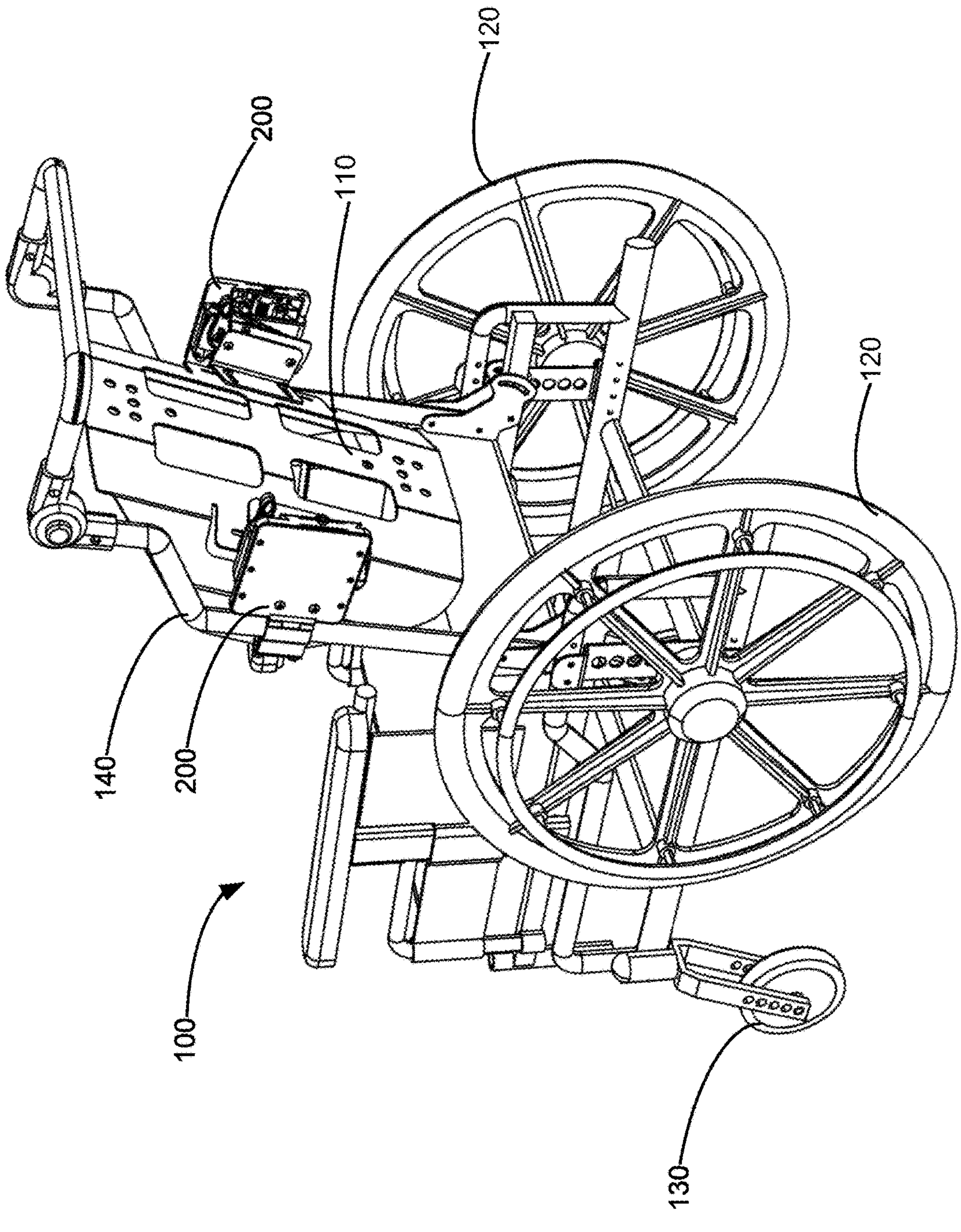
FIG. 1 shows a perspective view of a wheelchair and two adjustment devices.

FIG. 1 shows a seat 100, a seatback 110, and two adjustment devices 200 positioned on opposing sides of the seatback 110. The adjustment devices 200 support the seatback 110 and are configured to change the position of the seatback 110 relative to the seat 100.

In the example illustrated, the seat 100 is in the form of a wheelchair having rear wheels 120, front wheels 130, and a frame 140 (commonly referred to as "canes"). The adjustment devices 200 are shown coupled both to the frame 140 of the seat 100 and the seatback 110. In other examples, the seat can be a chair without wheels.

In some examples, the adjustment devices 200 can change the linear position and/or the angular position of the seatback 110. Changing the position of the seatback 110 relative to the seat 100 can allow different users to use the same seat 100 while adjusting the seatback 110 to their comfort, and/or can allow a user to modify the seat 100 depending on their desired use. Additionally, the seatback 110 can be removably coupled to the seat 100 by the adjustment devices 200, allowing for a change in seatback 110 depending on the desired use of the seat 100.

Figure 2:
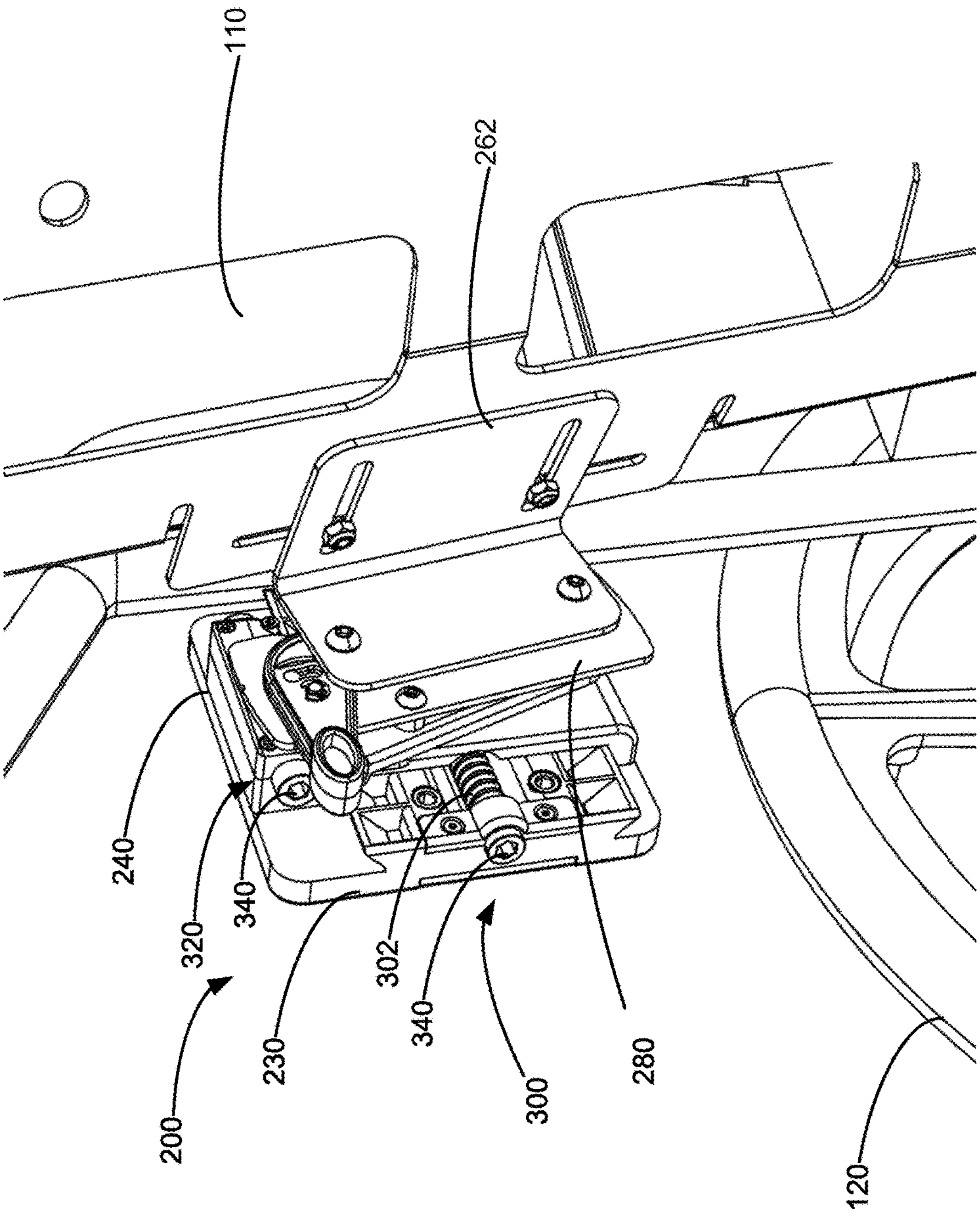
FIG. 2 shows a detailed perspective view of the wheelchair and one of the adjustment devices.

Referring to FIG. 2, the adjustment device 200 includes a first adjuster 300 and a second adjuster 320. In the example illustrated, the first adjuster 300 can be used to adjust a linear position of the seatback 110 relative to the seat 100, and the second adjuster 320 can be used to adjust an angular position of the seatback 110 relative to the seat 100.

Figure 3:
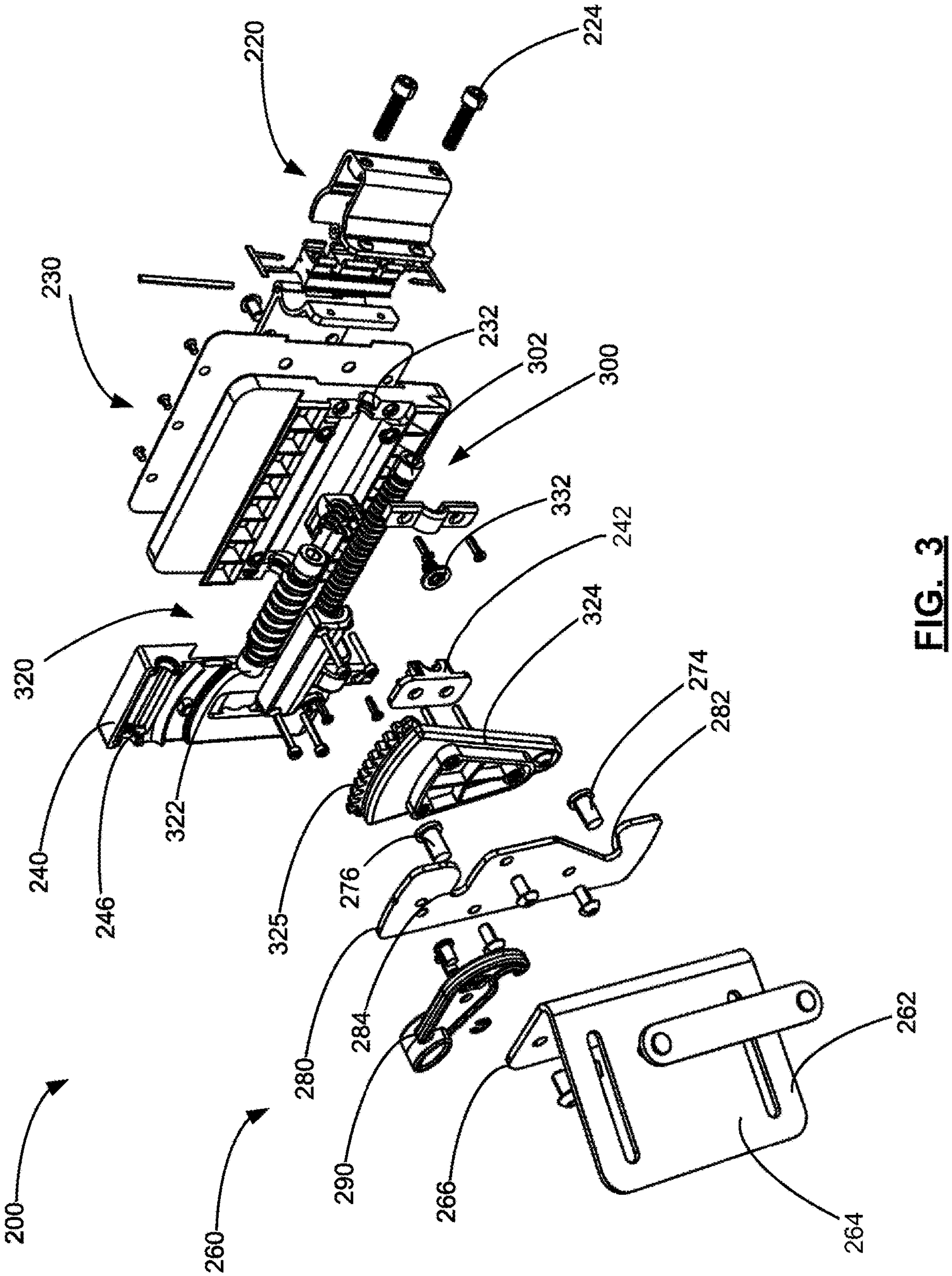
FIGS. 3 and 4 show exploded perspective views of the adjustment device.
Figure 4:
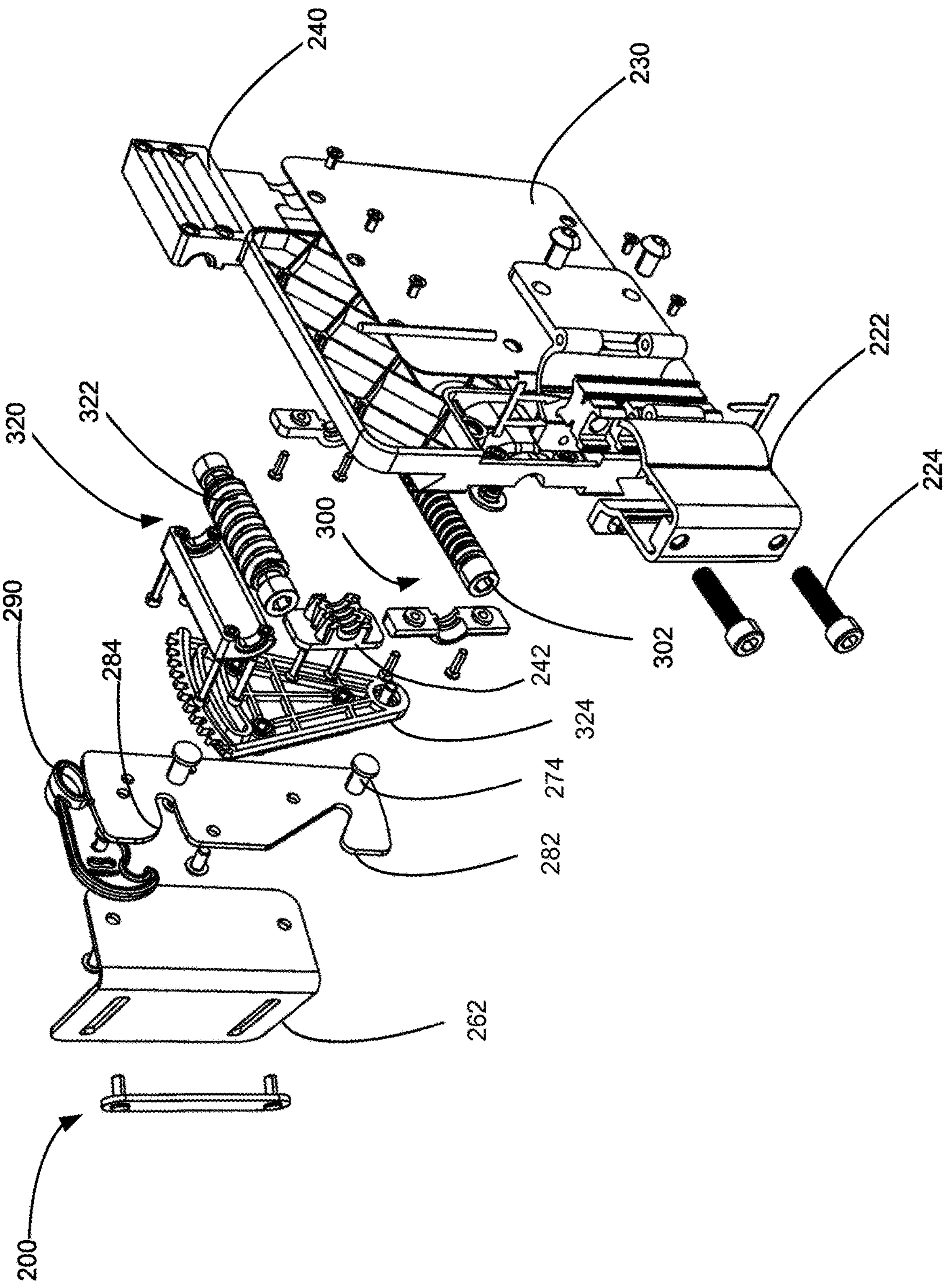

Referring to FIGS. 3 and 4, the first adjuster 300 includes a first linear actuator 302, and the second adjuster 320 includes a second linear actuator 322. In the example illustrated, each of the actuators 302, 322 takes the form of a cylindrical worm. Each of the actuators 302, 322 can be used to actuate their respective adjusters 300, 320 such that the position of the seatback 110 is adjusted relative to the seat 100.

In the example illustrated, the adjustment device 200 includes a main body 230 and a sliding bed 240. The first linear actuator 302 is received in a threaded recess 242 of the sliding bed 240 and a recess 232 of the main body 230. Threads of the first linear actuator 302 mesh with the threaded recess 242 to form a first worm gear. Accordingly, the first linear actuator 302 mechanically links the main body 230 and the sliding bed 240, and actuating the first linear actuator 302 causes linear displacement of the sliding bed 240 relative to the main body 230.

Figure 5:
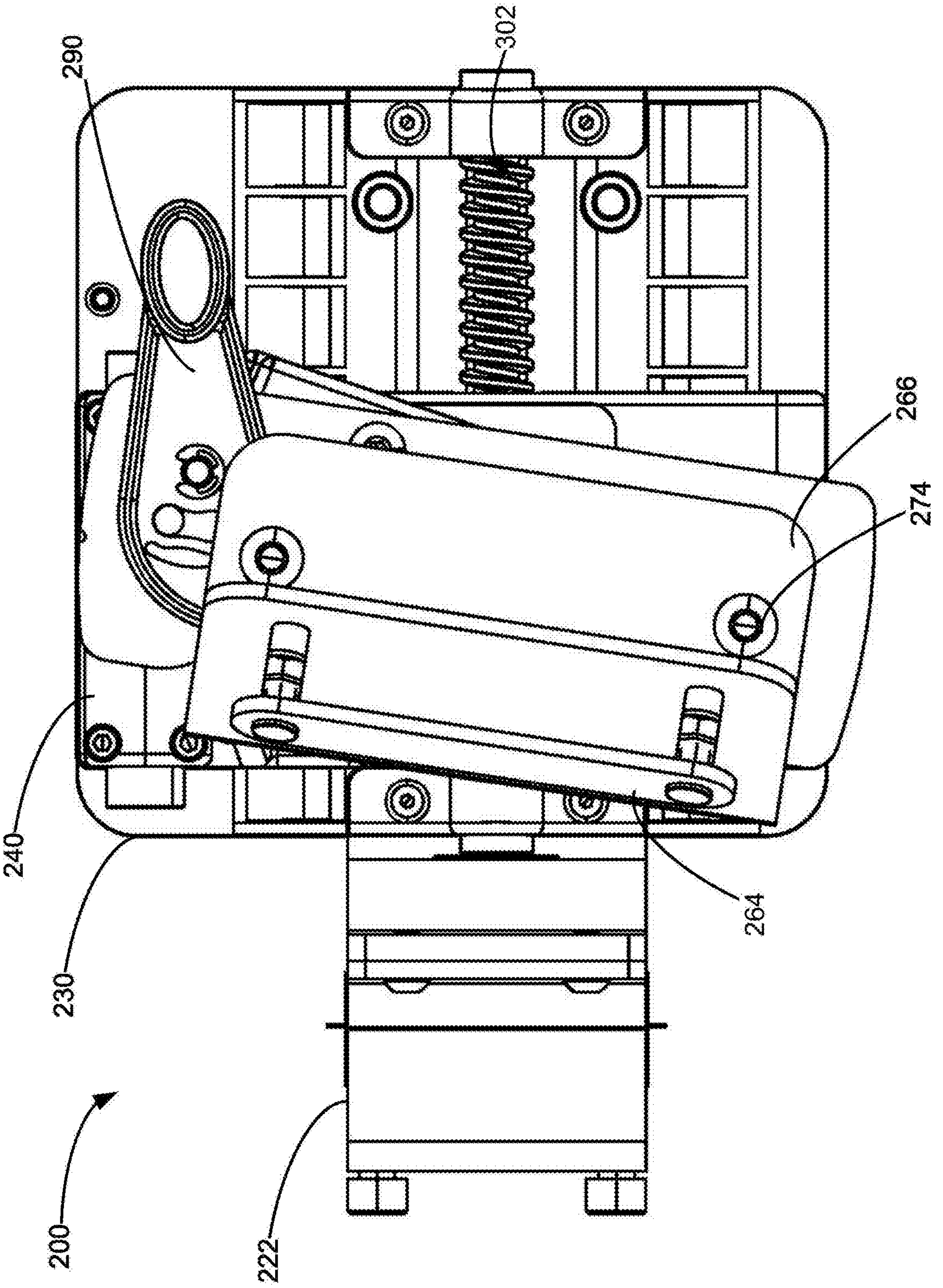
FIGS. 5 and 6 show an inner side view of the adjustment device in a first linear position and a second linear position, respectively.
Figure 6:
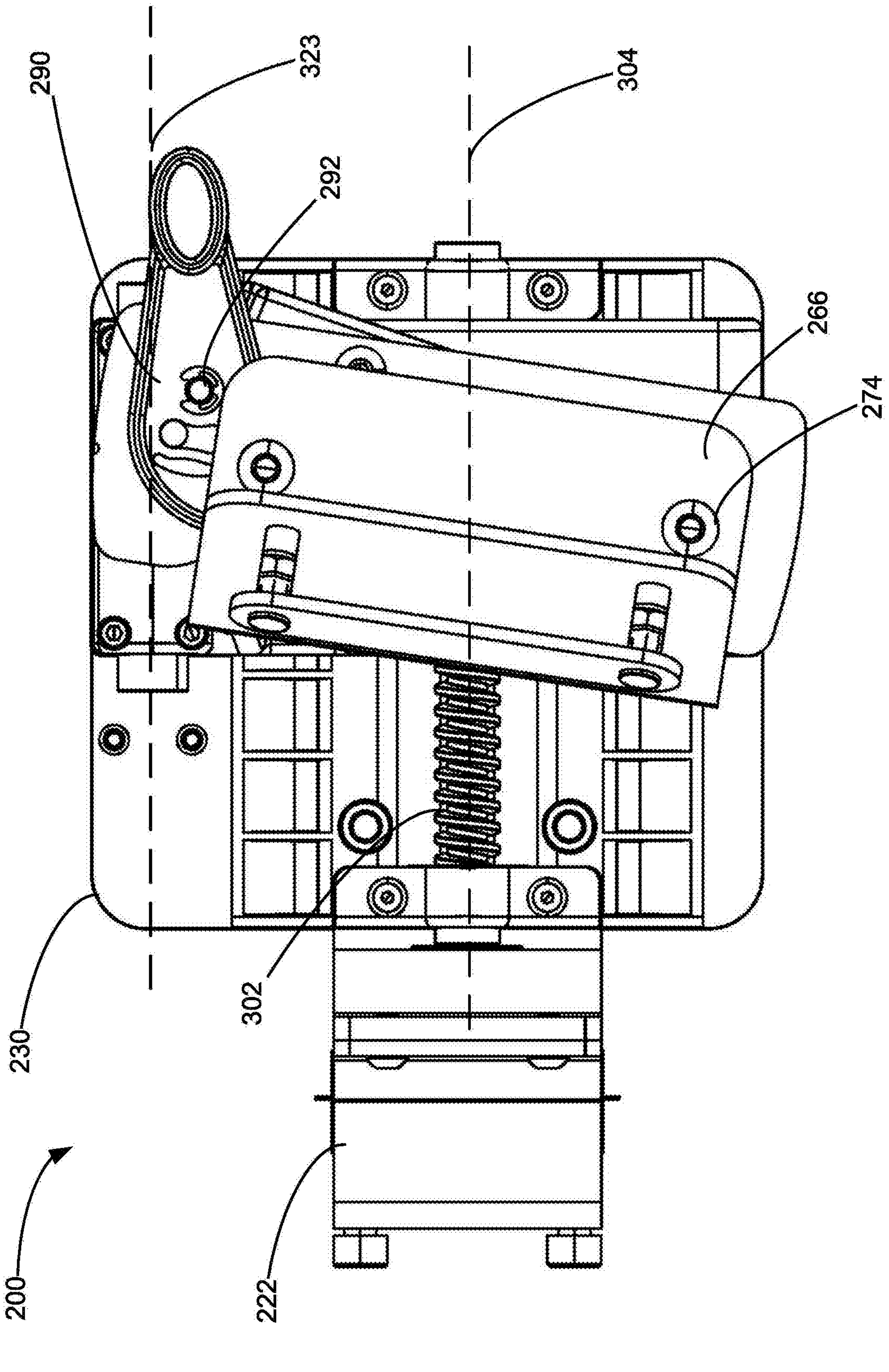

Referring to FIGS. 5 and 6, the first adjuster 300 is adjustable between a first linear position (FIG. 5) and a second linear position (FIG. 6). These positions are intended to be exemplary and non-limiting. In the example illustrated, the first linear actuator 302 is actuated about a first axis 304, and the sliding bed 240 translates between the first and second linear positions in a direction that is parallel to the first axis 304.

In the example illustrated, referring again to FIGS. 3 and 4, the adjustment device 200 includes an angle plate 324. The second linear actuator 322 is received in a recess 246 of the sliding bed 240, and the angle plate 324 is pivotably coupled to the sliding bed 240 by a pivot 332. Threads of the second linear actuator 322 mesh with teeth 325 of the angle plate 324 to form a second worm gear. Accordingly, the second linear actuator 322 mechanically links the sliding bed 240 and the angle plate 324, and actuating the second linear actuator 322 causes angular displacement of the angle plate 324 relative to the sliding bed 240.

Figure 7:
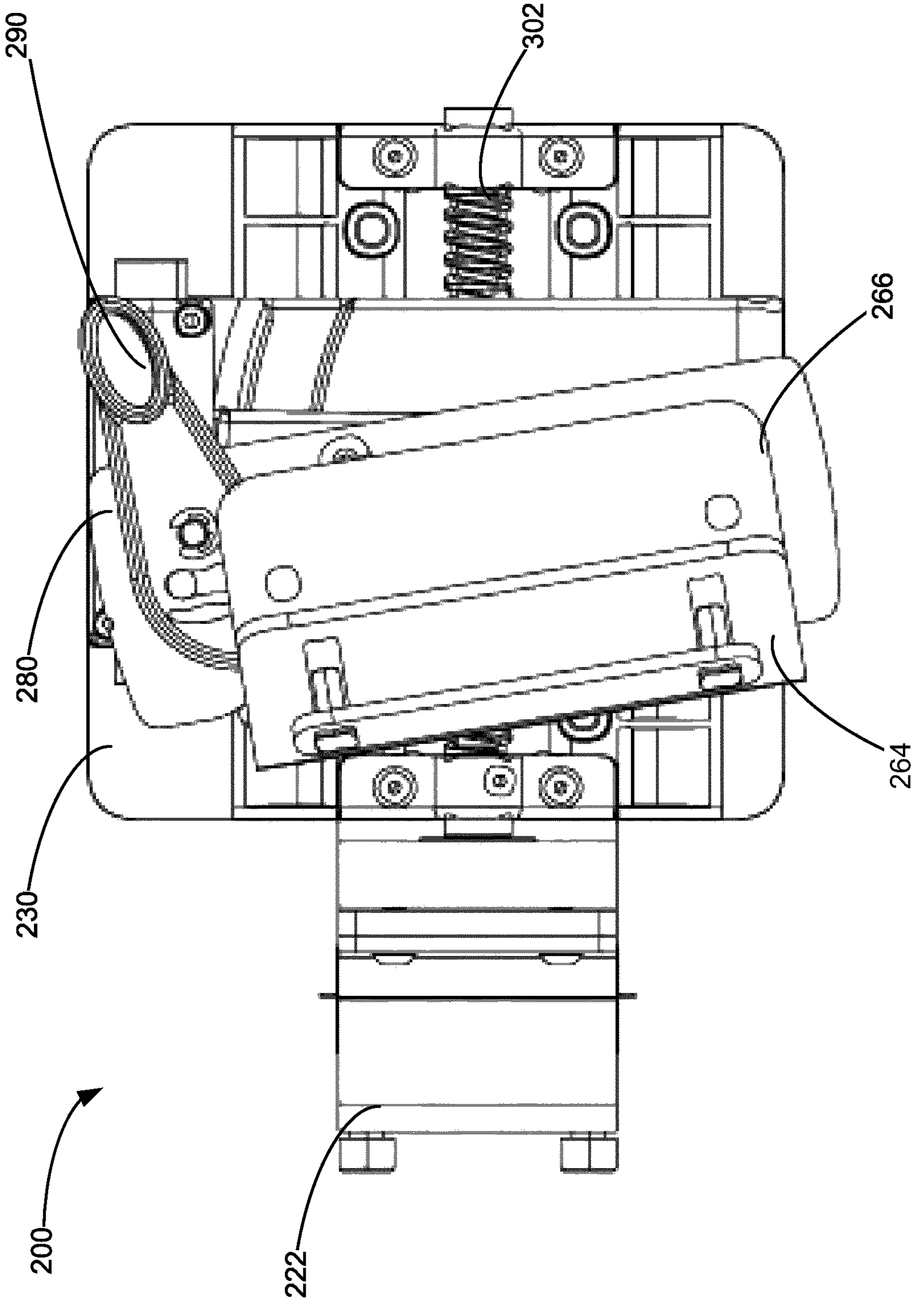
FIGS. 7 and 8 show an inner side view of the adjustment device in a first angular position and a second angular position, respectively.
Figure 8:
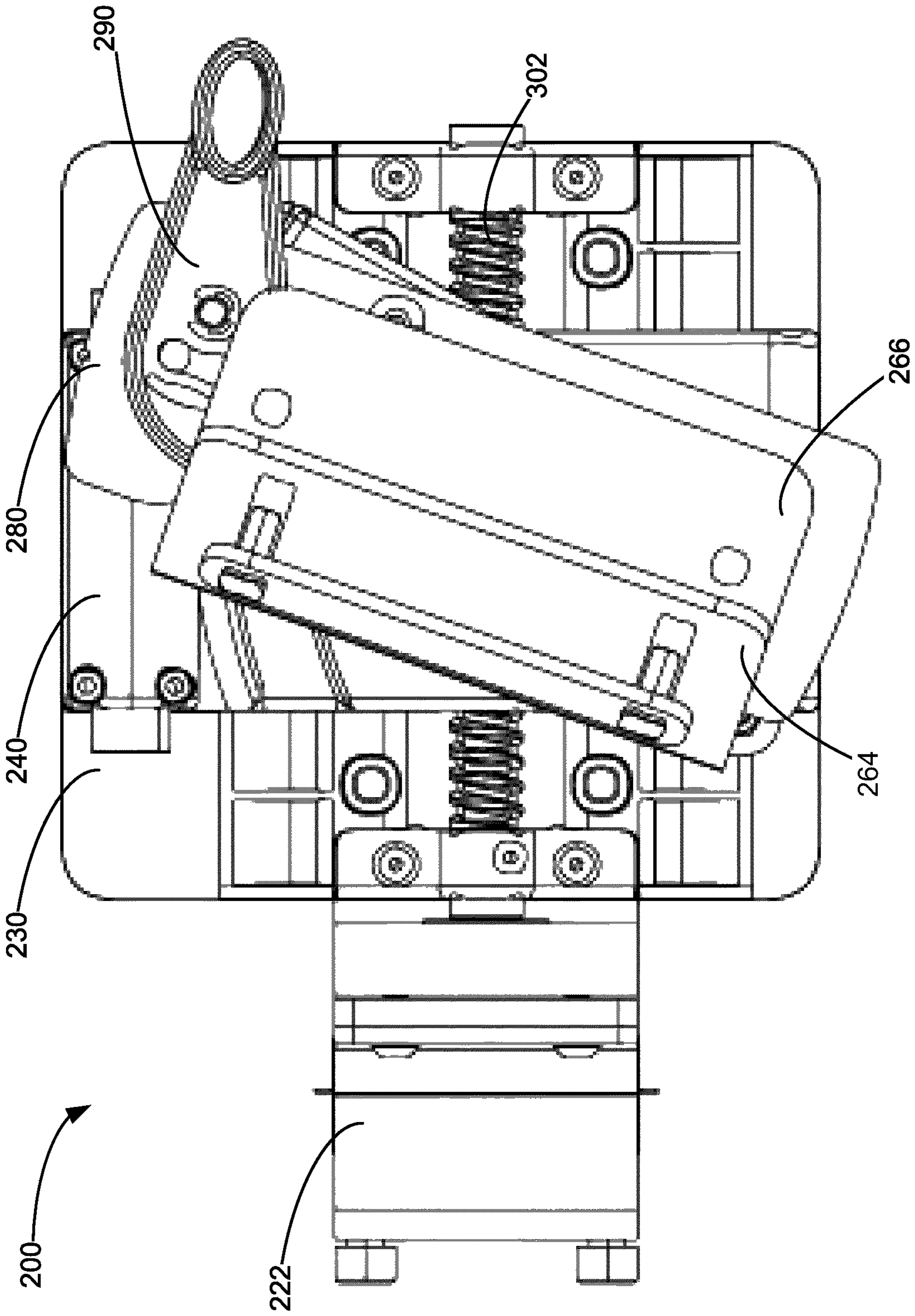

Referring to FIGS. 7 and 8, the second adjuster 320 is adjustable between a first angular position (FIG. 7) and a second angular position (FIG. 8). These positions are also intended to be exemplary and non-limiting. In the example illustrated, the second linear actuator 322 is actuated about a second axis 323, which can be parallel to the first axis 304. The angle plate 324 rotates between the first and second angular positions about a horizontal axis that is perpendicular to the second axis 323.

The first adjuster 300 and the second adjuster 320 can each be independently actuatable to change the position of the seatback 110 relative to the seat 100. In some examples, each of the adjusters 300, 320 can be infinitely adjustable between their respective positions, such that any combination of angular and/or linear positional change is possible. Independent actuation of the adjusters 300, 320 can permit modification of the seat 100 and the relative position of the seatback 110 to improve function and/or comfort for a variety of users.

The first adjuster 300 and the second adjuster 320 can each be manually actuated. In the example illustrated, referring to FIG. 2, each of the adjusters 300, 320 includes an engagement member 340. The engagement member 340 can be engaged by hand, such as by using fingers to turn them, or by a tool, such as a key that is shaped to mate with the engagement members 340. As shown, each of the engagement members 340 can be accessible from a rear side of the seatback 110. This can allow for someone to assist a seated user in adjusting the seatback 110.

Referring again to FIGS. 3 and 4, the adjustment device 200 includes a seat coupling mechanism 220. In the example illustrated, the seat coupling mechanism 220 includes a clamp 222 coupled to a main body 230. One or more fasteners 224 can be used to secure the clamp 222 to the frame 140 of the seat 100 (FIG. 1). The clamp 222 can be adjustably secured along a height of the frame 140 to raise and lower the seatback 110 relative to the seat 100. Optionally, a plastic spacer sleeve (not shown) can be provided to adapt the clamp 222 for use with canes having a smaller diameter.

The adjustment device 200 further includes a seatback coupling mechanism 260. In the example illustrated, the seatback coupling mechanism 260 includes a bracket 262, a latching plate 280, and a latch 290. The bracket 262 includes a first portion 264 and a second portion 266. The first portion 264 of the bracket 262 can be coupled to the seatback 110 by fasteners. The second portion 266 of the bracket 262 can include lower and upper pins 274, 276 that are mounted thereon. The latching plate 280 is secured to the angle plate 324, and includes a notch 284 and a hook 282 for receiving the pins 274, 276, respectively. The lower pin 274 can be retained by the hook 282 to connect the adjustment device 200 and the seatback 110.

In the example illustrated, the latch 290 is pivotably mounted to the latching plate 280 and can be moved manually between unlocked and locked positions. Like the engagement members 340, the latch 290 can be accessible from a rear side of the seatback 110 (FIG. 2). In the unlocked position, the latch 290 is raised clear of the notch 284 and the upper pin 276 can be received by the notch 284. In the locked position, the latch 290 restricts the upper pin 276 within the notch 284. In this manner, the bracket 262, the latching plate 280, and the latch 290 of the seatback coupling mechanism 260 can operate as a quick release mechanism for connecting and disconnecting the adjustment device 200 and the seatback 110.

In the example illustrated, when the latch 290 is in the locked position and the clamp 222 is secured to the frame 140, the adjustment device 200 can support the seatback 110, and can be used to adjust the position of the seatback 110 relative to the seat 100.

While the above description provides examples of one or more apparatuses or methods, it will be appreciated that other apparatuses or methods may be within the scope of the accompanying claims.

We claim:

1. An adjustment device for removably coupling a seatback to a seat, the adjustment device comprising:
- a first adjuster for adjusting a linear position of the seatback relative to the seat; and
- a second adjuster for adjusting an angular position of the seatback relative to the seat, wherein:
- the first adjuster comprises a first linear actuator, comprising a main body and a sliding bed, and the first linear actuator links the main body and the sliding bed such that actuating the first linear actuator causes linear displacement of the sliding bed relative to the main body, and
- the first linear actuator comprises a first cylindrical worm, and threads of the first linear actuator mesh with a threaded recess of the sliding bed; and
- the second adjuster comprises a second linear actuator, comprising the sliding bed and an angle plate pivotably coupled to the sliding bed, and the second linear actuator links the sliding bed and the angle plate such that actuating the second linear actuator causes angular displacement of the angle plate relative to the sliding bed, and
- the second linear actuator comprises a second cylindrical worm, and worm threads of the second linear actuator mesh with teeth of the angle plate.

2. The adjustment device of claim 1, wherein the first linear actuator is actuated about a first axis, and the sliding bed translates between first and second linear positions in a direction that is parallel to the first axis.

3. The adjustment device of claim 2, wherein the second linear actuator is actuated about a second axis, and the angle plate rotates between first and second angular positions about an axis that is perpendicular to the second axis.

4. The adjustment device of claim 3, wherein the second axis is parallel to the first axis.

5. The adjustment device of claim 1, wherein the second linear actuator is actuated about a second axis, and the angle plate rotates between first and second angular positions about an axis that is perpendicular to the second axis.

6. The adjustment device of claim 1, wherein the first adjuster and the second adjuster are independently actuatable to change the position of the seatback relative to the seat.

7. The adjustment device of claim 1, wherein each of the first linear actuator and the second linear actuator are manually actuatable.

8. The adjustment device of claim 1, wherein the first linear actuator and the second linear actuator are each actuatable from a rear side of the adjustment device.

9. The adjustment device of claim 1, comprising a seatback coupling mechanism for removably securing the adjustment device to the seatback, the seatback coupling mechanism comprising:
- a bracket comprising a first portion for coupling to the seatback, and a second portion comprising upper and lower pins; and
- a latching plate comprising a notch and a hook for receiving the upper and lower pins, respectively, to connect the adjustment device and the seatback.

10. The adjustment device of claim 9, wherein the seatback coupling mechanism comprises a latch moveable between an unlocked position in which the latch is clear of the notch, and a locked position in which the latch restricts the upper pin within the notch.

11. The adjustment device of claim 1, comprising a seat coupling mechanism for removably securing the adjustment device to a frame of the seat, the seat coupling mechanism comprising a clamp that is configured to be secured to the frame of the seat.

12. The adjustment device of claim 11, wherein the seat coupling mechanism is adjustable to raise and lower the seatback relative to the seat.

13. In combination, the adjustment device of claim 1, the seatback, and the seat.

14. An adjustment device for removably coupling a seatback to a seat, the adjustment device comprising:

a first adjuster for adjusting a linear position of the seatback relative to the seat; and a second adjuster for adjusting an angular position of the seatback relative to the seat, wherein:

the first adjuster comprises a first linear actuator, comprising a main body and a sliding bed, and the first linear actuator links the main body and the sliding bed such that actuating the first linear actuator causes linear displacement of the sliding bed relative to the main body, and the first linear actuator is actuated about a first axis, and the sliding bed translates between first and second linear positions in a direction that is parallel to the first axis; and the second adjuster comprises a second linear actuator, comprising the sliding bed and an angle plate pivotably coupled to the sliding bed, and the second linear actuator links the sliding bed and the angle plate such that actuating the second linear actuator causes angular displacement of the angle plate relative to the sliding bed, and the second linear actuator is actuated about a second axis, and the angle plate rotates between first and second angular positions about an axis that is perpendicular to the second axis, wherein the first adjuster and the second adjuster are independently actuatable to change the linear and angular positions, respectively, of the seatback relative to the seat.

* * * * *